(12) United States Patent
Johnson et al.

(10) Patent No.: US 9,398,236 B2
(45) Date of Patent: Jul. 19, 2016

(54) IMAGE CAPTURING APPARATUS

(71) Applicant: CANON KABUSHIKI KAISHA, Tokyo (JP)

(72) Inventors: Michiko Johnson, Machida (JP); Masahiro Kobayashi, Tokyo (JP); Hideyuki Itoh, Kawasaki (JP); Takeshi Ichikawa, Hachioji (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/519,464

(22) Filed: Oct. 21, 2014

(65) Prior Publication Data

US 2015/0138404 A1   May 21, 2015

(30) Foreign Application Priority Data

Nov. 18, 2013   (JP) .................................. 2013-238266

(51) Int. Cl.
| | |
|---|---|
| *H04N 5/359* | (2011.01) |
| *H04N 5/235* | (2006.01) |
| *G03B 7/097* | (2006.01) |
| *H04N 5/232* | (2006.01) |
| *H04N 5/353* | (2011.01) |

(52) U.S. Cl.
CPC ................ *H04N 5/359* (2013.01); *G03B 7/097* (2013.01); *H04N 5/2353* (2013.01); *H04N 5/23245* (2013.01); *H04N 5/3532* (2013.01)

(58) Field of Classification Search
CPC ... H04N 5/359; H04N 5/2353; H04N 5/3532; H04N 5/23245; G03B 7/097
See application file for complete search history.

(56) References Cited

U.S. PATENT DOCUMENTS

| | | | |
|---|---|---|---|
| 7,920,204 B2 | 4/2011 | Miyanari | |
| 8,625,010 B2 | 1/2014 | Yamashita et al. | |
| 2008/0284873 A1 | 11/2008 | Miyanari | |
| 2008/0298791 A1* | 12/2008 | Noda | G03B 7/00 396/55 |
| 2010/0188541 A1* | 7/2010 | Mabuchi | H01L 27/14656 348/302 |
| 2012/0320231 A1 | 12/2012 | Suito | |
| 2013/0206964 A1 | 8/2013 | Yamashita et al. | |

FOREIGN PATENT DOCUMENTS

| | | |
|---|---|---|
| JP | 2008-022198 A | 1/2008 |
| JP | 2008-219523 A | 9/2008 |
| JP | 2011-166397 A | 8/2011 |

\* cited by examiner

*Primary Examiner* — Mekonnen Dagnew
(74) *Attorney, Agent, or Firm* — Fitzpatrick, Cella, Harper & Scinto (57) ABSTRACT

An image capturing apparatus including a plurality of pixels arranged in a matrix and a signal processing unit configured to process signals read out from the pixels. In a first mode, a charge accumulation is controlled by an electronic shutter. In a second mode, the charge accumulation is controlled by a mechanical shutter. The signal processing unit corrects image data obtained from the plurality of pixels based on a signal obtained by the charge accumulation in the second mode.

9 Claims, 6 Drawing Sheets

IMAGE CAPTURING APPARATUS

BACKGROUND OF THE INVENTION

1. Field of the Invention

The present invention relates to an image capturing apparatus including an electronic shutter and a mechanical shutter.

2. Description of the Related Art

In recent years, there have been proposed image capturing apparatuses for outputting an image obtained by controlling an exposure time by an electronic shutter and an image obtained by controlling an exposure time by a mechanical shutter. Japanese Patent Laid-Open No. 2008-22198 discloses a technique of calculating a shift between the timing of the reset operation of an image sensor and the traveling characteristic of the blades of a mechanical shutter when capturing still images by an electronic shutter and the mechanical shutter.

In a digital camera, there are broadly two kinds of methods of controlling the exposure time of an image capturing apparatus. One method is a mechanical shutter for physically blocking light entering from an object to pixels. The other method is an electronic shutter for electrically controlling resetting of pixels and readout of charges.

A general method of driving a mechanical shutter will be described. The mechanical shutter includes two blade units each pivoted on a shutter plate. Each blade unit rotatably holds a group of a plurality of divided shutter blades by two arms. One blade unit functions as leading blades that cause a shutter opening to transit from a shielding state to a full-open state at the time of exposure. The other blade unit functions as trailing blades that cause the shutter opening to transit from the full-open state to the shielding state at the time of exposure. Each of the blade units respectively forming the leading blades and trailing blades is connected to a driving member including a driving source such as a spring for providing power in a predetermined direction and an armature chucked and held by a control magnet. As the operation of the mechanical shutter, a charge lever moves the mechanical shutter to a position where the blade units are held on a yoke chucking surface. This operation causes the leading blades to shield the shutter opening. When a shutter button is operated, application of power to a coil for the control magnet of the leading blades is canceled, and the leading blades travel to release the shutter opening. After a time corresponding to a shutter speed elapses, application of power to the coil for the control magnet of the trailing blades is stopped, and the trailing blades shield the shutter opening.

On the other hand, as the operation of the electronic shutter, exposure starts after a reset operation of discarding signal charges accumulated in the pixels outside photodiodes. At the time of start of exposure, the photodiodes start to accumulate charges. After a predetermined time, an operation of reading out the charges from the photodiodes starts. The electronic shutter controls the shutter speed by the time from when the pixels start exposure after the reset operation until the charges accumulated in the photodiodes are read out.

In the image capturing apparatus described in Japanese Patent Laid-Open No. 2008-22198, the electronic shutter is used to perform shooting in a moving image capturing mode. When performing shooting in a still image capturing mode, the leading blade function of the mechanical shutter is implemented by the electronic shutter, and the trailing blade function is implemented by the mechanical shutter. The exposure times of the pixels arranged in the row and column directions are equalized by making the start of accumulation of charges in the pixels coincide with the traveling characteristic of the trailing blades. The pixels are almost simultaneously reset at a timing coinciding with the traveling characteristic of the trailing blades in the still image capturing mode, and the mechanical shutter almost simultaneously shields the light-receiving surfaces of the pixels.

SUMMARY OF THE INVENTION

The first aspect of the present invention provides an image capturing apparatus including a plurality of pixels arranged in a matrix and a signal processing unit configured to process signals read out from the pixels. In a first mode, a charge accumulation is controlled by an electronic shutter. In a second mode, the charge accumulation is controlled by a mechanical shutter. The signal processing unit corrects image data obtained from the plurality of pixels based on a signal obtained by the charge accumulation in the second mode.

Further features of the present invention will become apparent from the following description of exemplary embodiments with reference to the attached drawings.

DESCRIPTION OF THE EMBODIMENTS

In an image capturing apparatus in which the leading blade function of a shutter is implemented by an electronic shutter and the trailing blade function of the shutter is implemented by a mechanical shutter, the exposure times of any pixels from when accumulation of charges starts until the pixels are shielded from light can be equalized. However, the time until an operation of reading out the charges accumulated by exposure starts is different for each row. That is, the period ("accumulation time"), from when accumulation of charges by exposure starts until the accumulated charges are read out, on a row where the charges are read out last is longer (later) than that on a row where an operation of reading out the charges starts first. Therefore, the luminance, dark current, and the like are different for each row due to the influence of the difference in time until the charges are read out after the light-shielding operation, and noise such as shading may occur. The present invention has been made in consideration of such problem, and provides an image capturing apparatus that corrects a decrease in image quality caused by noise occurring in image capturing signals when capturing an image by switching an image capturing operation by the electronic shutter to that by the mechanical shutter.

(First Embodiment)

The first embodiment of the present invention will be described below with reference to the accompanying drawings. A single-lens reflex digital camera according to the present invention will be described with reference to FIG. 1. Although a single-lens reflex digital camera will be exemplified in this embodiment, the present invention is not limited to this. The present invention is also applicable to an image capturing apparatus having another arrangement as long as the image capturing apparatus has an arrangement which includes an image sensor for outputting image data as an electronic signal and controls the exposure time of the image sensor using a mechanical shutter as a light-shielding member.

Figure 1:
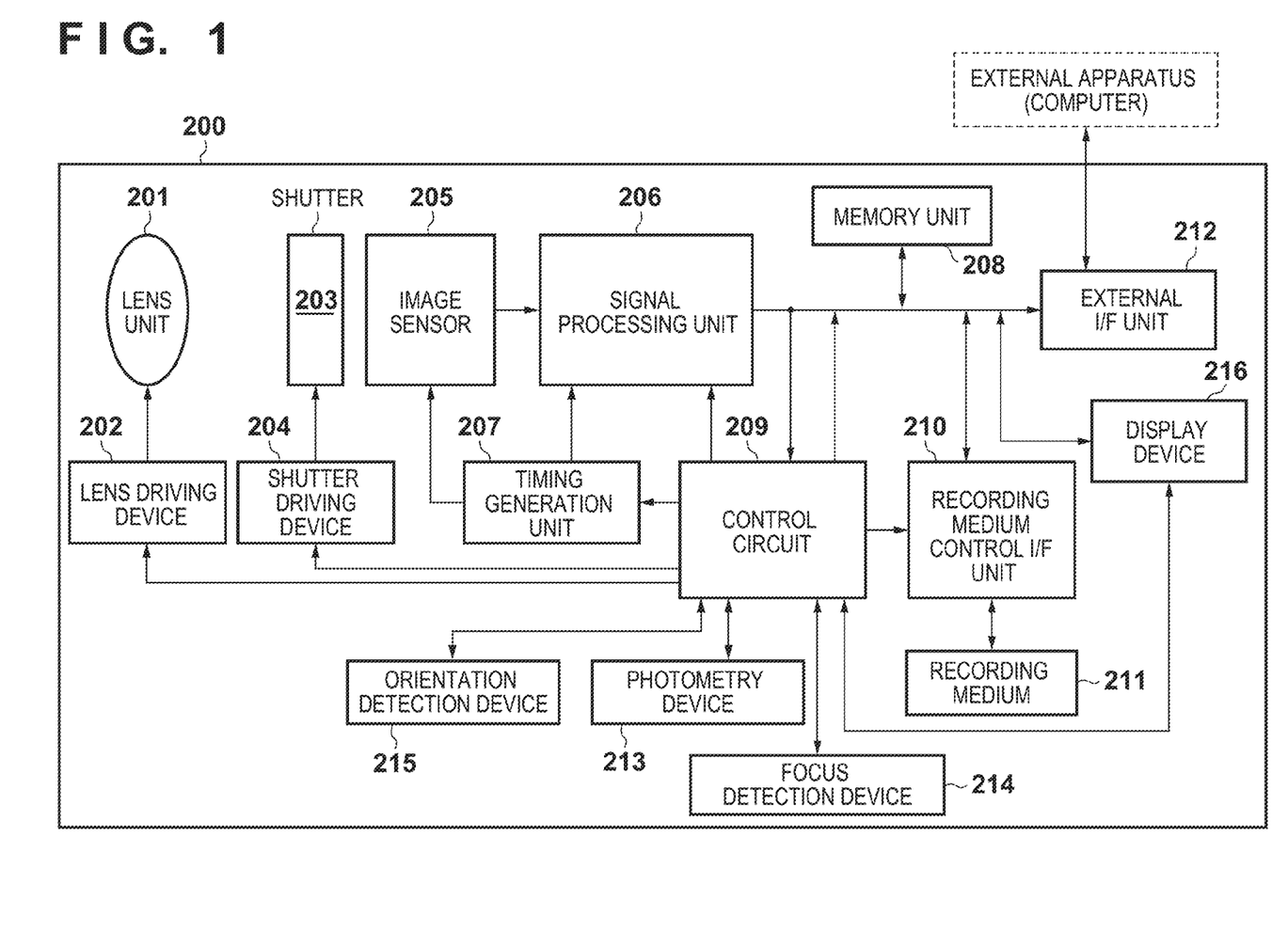
FIG. 1 is a block diagram showing parts constituting a single-lens reflex digital camera.

In this embodiment, the digital camera includes an electronic shutter and mechanical shutter as shutters 203, and includes, as image capturing modes, a moving image capturing mode using the electronic shutter and a still image capturing mode using the electronic shutter and the mechanical shutter. The mechanical shutter includes a blade unit corresponding to trailing blades used in the single-lens reflex camera. A shutter driving device 204 is a device for operating the shutters 203, and includes a charge lever and control magnet.

Figure 5:
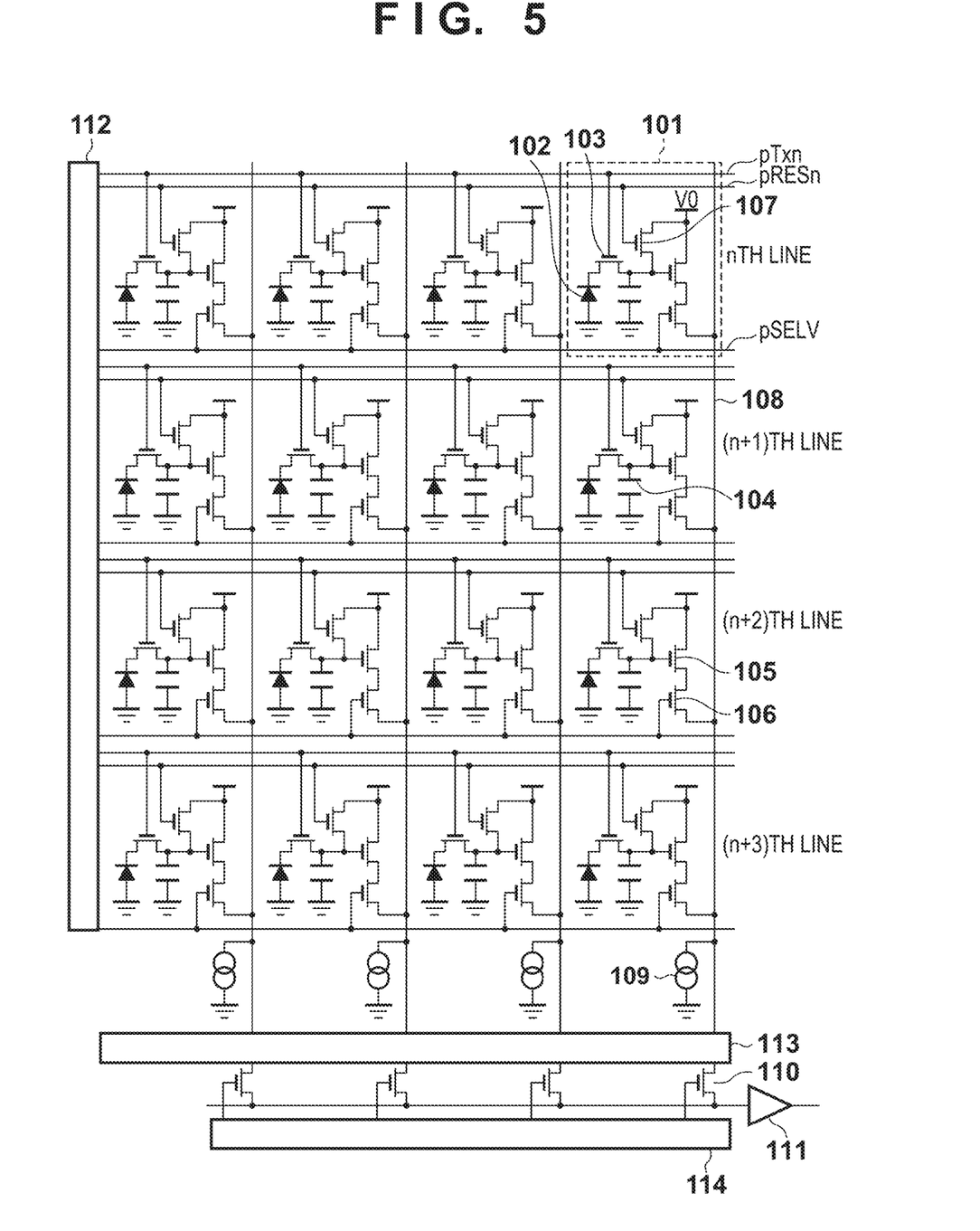
FIG. 5 is a circuit diagram showing the arrangement of pixels arranged in the row and column directions according to the present invention.
Figure 6:
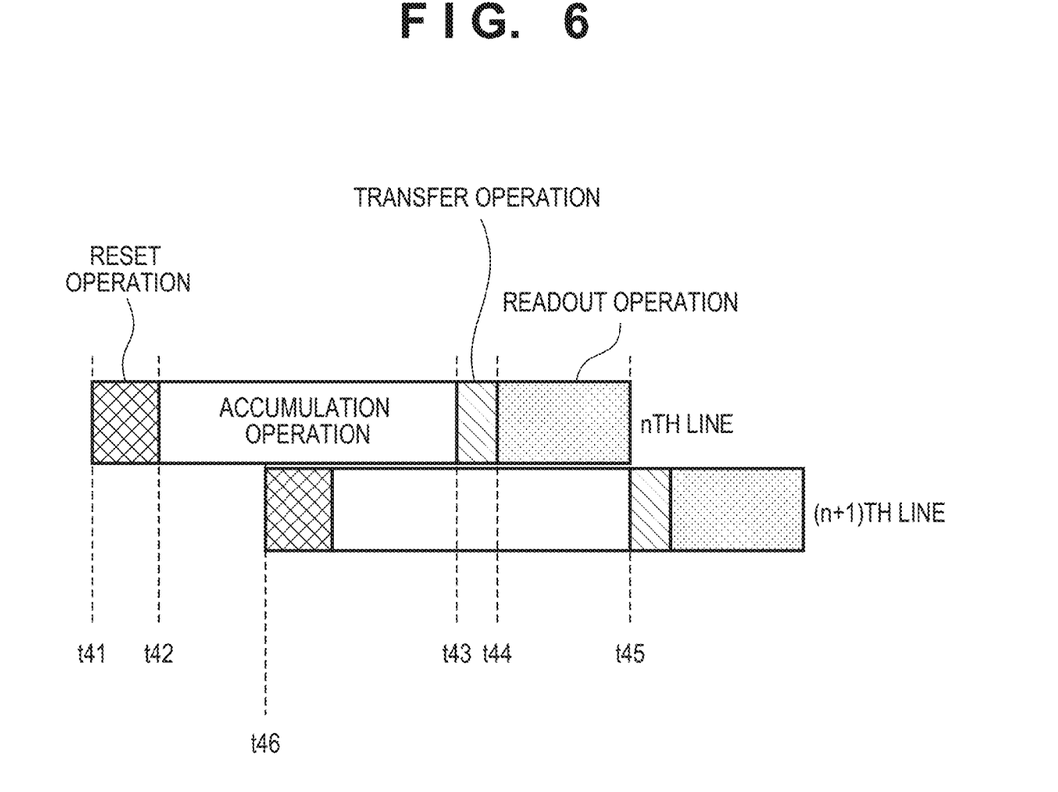
FIG. 6 is a view showing driving pulses in the moving image capturing mode according to the first embodiment of the present invention.

The operation of the electronic shutter will be described with reference to FIGS. 5 and 6. A unit pixel 101 of the image capturing apparatus will be explained. A photodiode (to be referred to as a PD hereinafter) 102 for converting light into charges accumulates charges. A transfer switch 103 transfers the charges generated in the PD to an FD (to be described later) by a transfer pulse pTX. A floating diffusion (to be referred to as an FD hereinafter) 104 temporarily accumulates the charges. An amplification MOS transistor 105 functions as a source follower. A selection switch 106 selects a pixel by a selection pulse pSELV. A reset switch 107 removes the charges accumulated in the FD 104 by a reset pulse pRES. The FD 104, the amplification MOS transistor 105, and a constant-current source 109 form a floating diffusion amplifier. Unit pixels having the above arrangement are arranged in the row and column directions. Each pixel is driven by peripheral circuits such as a horizontal scanning circuit 114 and vertical scanning circuit 112 for reading out a signal, and a signal is read out from the pixel. Charges in a pixel selected by the selection switch 106 are converted into a voltage, and output to a readout circuit 113 via a signal output line 108. The constant-current source 109 serves as the load of the amplification MOS transistor 105. A vertical scanning circuit 112 outputs a control signal for scanning pixels on each row by controlling the transfer switch 103, selection switch 106, and reset switch 107. A selection switch 110 driven by a horizontal scanning circuit 114 selects an output signal from the readout circuit 113.

As for the transfer pulse pTX, reset pulse pRES, and selection pulse pSELV, respective pulses on the nth scanning line (the nth line) scanned and selected by the vertical scanning circuit 112 are represented by pTXn, pRESn, and pSELVn. An image capturing operation will be performed as follows. On the nth line, during the time from a time t41 to a time t42, the pulses pRESn and pTXn are applied to turn on the transfer switches 103 and reset switches 107. A reset operation of removing unneeded charges accumulated in the PDs 102 and FDs 104 on the nth line is performed. When the reset operation is performed, the transfer switches 103 are turned off at the time t42, and an accumulation operation of accumulating photo-charges generated in the PDs starts. At a time t43, the pulse pTXn is applied to turn on the transfer switches 103, and a transfer operation of transferring the photo-charges accumulated in the PDs 102 to the FDs 104. Note that the reset switches 107 need to be turned off before the transfer operation. In FIG. 6, at the time t42, the reset switches 107 are turned off simultaneously with the transfer switches 103. The time from the time t42 to the time t43 is an exposure time.

After the operation of transferring the charges in the PDs 102 to the FDs 104 on the nth line ends, when the selection pulse pSELVn is applied to turn on the selection switches 106, the charges held in the FDs 104 are converted into voltages, and output to the readout circuit 113 as signals. The time from the start of the transfer operation at the time t43 to the end of a readout operation at a time t45 is a readout time on the nth line. The timing of a transfer operation on the (n+1)th line is adjusted to start immediately after the readout time on the nth line elapses. The time from the time t41 at which the reset operation on the nth line starts to a time t46 at which a reset operation on the (n+1)th line starts is a standby time on the (n+1)th line. Similarly, on other lines, the time from the start of a transfer operation to the end of a readout operation is a readout time, and the time from the start of a reset operation on a given line to the start of a reset operation on a next line is a standby time. The arrangement in which processing from a reset operation to a readout operation is performed for each pixel row at different timings will be referred to as the rolling shutter operation of the electronic shutter hereinafter. When capturing an image by the electronic shutter, the start timing of accumulation of charges is different for each pixel row. However, the time required to accumulate charges by exposure can be constant in the image capturing apparatus.

In the still image capturing mode of this embodiment, when the electronic shutter performs the reset operation of the pixels, a charge accumulation operation starts, and the exposure time is adjusted by shielding, from light, the light-receiving surfaces of the pixels arranged in the row and column directions by a trailing blade unit. In this case, the exposure time of the image capturing apparatus is made constant by adjusting the timing of the reset operation to the traveling of the trailing blade unit. The exposure time of the image capturing apparatus is controlled by changing the time from the start of the reset operation until the light-shielding operation by the trailing blade unit. In this arrangement, accumulation of charges by exposure starts by almost simultaneously resetting the pixels at a timing coinciding with the traveling characteristic of the trailing blades, and all the pixels are almost simultaneously shielded from light by the mechanical shutter (trailing blades).

FIGS. 2A, 2B, 3A and 3B show the relationship between the timing of the reset operation and the timing of reading out signals after the light-shielding operation by the trailing blades in the still image capturing mode. FIGS. 2A, 2B, 3A and 3B show a case in which an image is captured by switching the image capturing mode from the moving image capturing mode by electronic shutter control using an electronic viewfinder to the still image capturing mode by mechanical shutter control. As shown in flowcharts of FIG. 3A and 3B, in the moving image capturing mode, the mechanical shutter is open and the pixels are always irradiated with light. In the moving image capturing mode, the reset operation of the pixels starts a charge accumulation operation. The reset operation is sequentially performed for the respective pixel rows at different timings in the moving image capturing mode after a time t1, as indicated by oblique lines in FIG. 2A. Signals are sequentially read out from the pixels on each row after the set exposure time elapses. During the rolling shutter operation of the electronic shutter, the exposure time is constant in the moving image capturing mode by appropriately adjusting the start timing of the reset operation and the start timing of the readout operation. While the electronic shutter operates in the moving capturing mode, the mechanical shutter is released.

Figure 2A:
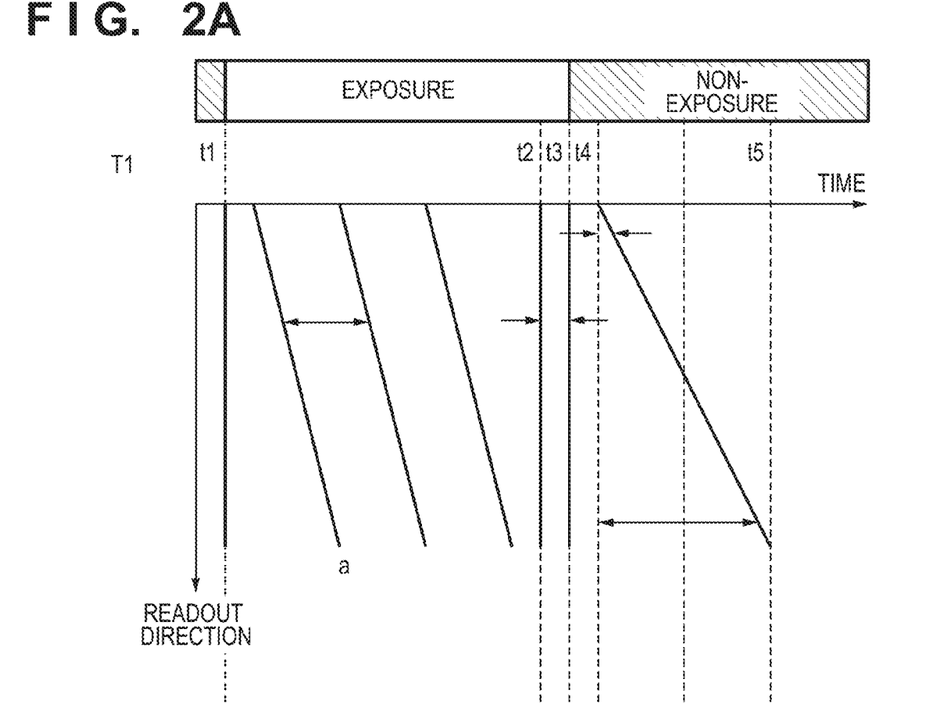
FIG. 2A and 2B are timing charts of a shutter device for an electronic shutter control image (moving image capturing mode) and a mechanical shutter control image (still image capturing mode) according to the first embodiment of the present invention.
Figure 4A:
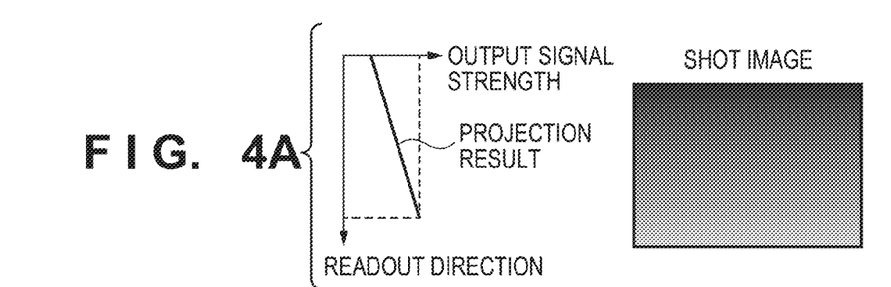
FIG. 4A, 4B and 4C are schematic views showing correction according to the first embodiment of the present invention.

On the other hand, when capturing an image by the mechanical shutter by switching the mode from the moving image capturing mode to the still image capturing mode, the electronic shutter almost simultaneously resets the pixels at a timing coinciding with the traveling characteristic of the trailing blades. At a time t2, exposure starts, and a charge accumulation operation starts. At a time t3, the mechanical shutter almost simultaneously shields all the pixels from light. After that, at a time t4, an operation of reading out signals from the pixels starts. In the still image capturing mode, the exposure time is controlled by appropriately adjusting the timing of the reset operation of the pixels by the electronic shutter and that of the light-shielding operation by the mechanical shutter. In the still image capturing mode, however, when reading out signals from the upper portion of the screen as shown in FIG. 2A, the accumulation time from when accumulation of charges by exposure starts until the accumulated charges are read out is equal to the time from the time t2 to the time t4 in the upper portion of the screen, and the time from the time t2 to a time t5 in the lower portion of the screen. In the still image capturing mode, therefore, the pixels on each row are equal in exposure time from the start of accumulation by the electronic shutter until the light-shielding operation by the mechanical shutter is performed, but are different in time until an operation of reading out the signals from the pixels on each row starts after the light-shielding operation. When a uniform image is captured, a difference between the upper and lower portions of the shot image occurs due to the influence of noise, as shown in FIG. 4A.

In the still image capturing mode, an operation of reading out the signals from the pixels is performed after the reset operation by the electronic shutter function starts exposure and the mechanical shutter performs a light-shielding operation. Therefore, the time until the signals are read out on each row is different. Due to a difference in accumulation time including the time from the start of exposure until the signals are read out from the pixels after the light-shielding operation, the luminance, dark current, and the like are different for each row. Consequently, as shown in FIG. 4A, noise such as shading may occur.

More specifically, assume that the number of rows in a given image sensor is n and the time taken to read out the charge accumulation amounts of all the pixels is the time (t5−t4) shown in FIG. 2. In this case, the accumulation time on the nth row simply increases by t5−t4, as compared with the first row. During this time, in addition to the charges obtained by converting incident light from the object, noise charges such as a dark current generated by a pixel unit or the like after exposure and the like are accumulated in the photodiodes. Therefore, between the nth and first rows, a difference occurs in noise charges dependent on an accumulation time since the readout timings are different.

Figure 2B:
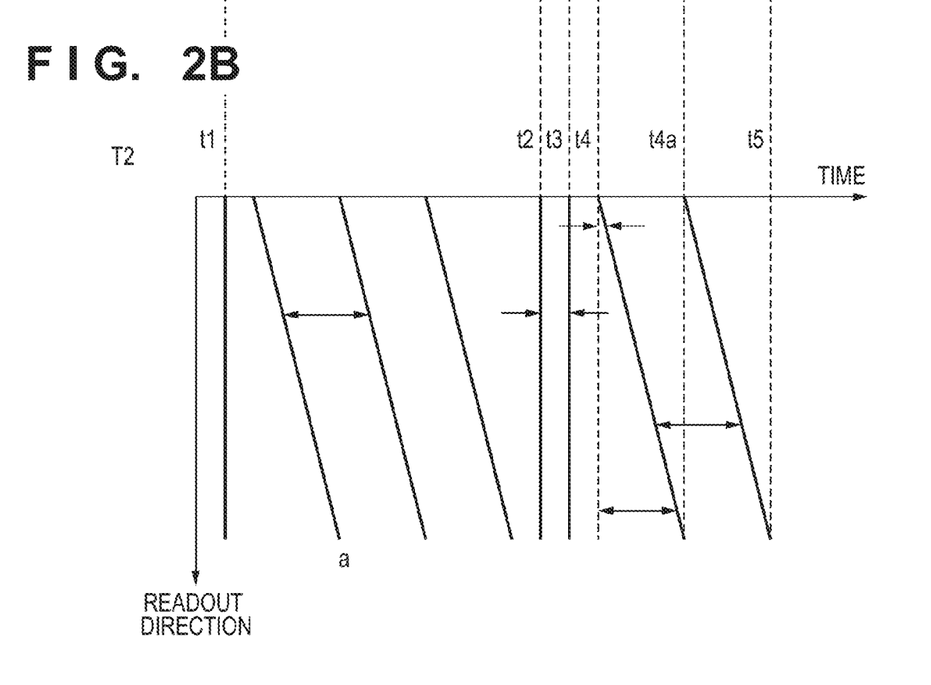
Figure 3A:
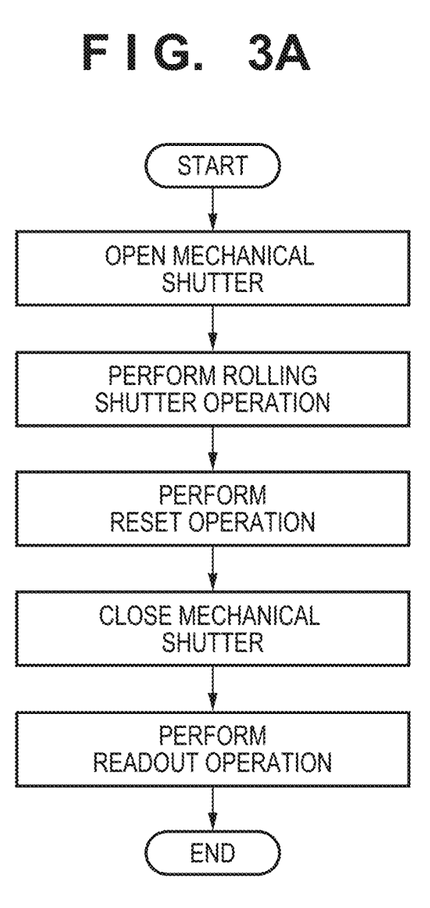
FIG. 3A and 3B show flowcharts each illustrating the operation sequence of the shutter device for the electronic shutter control image (moving image capturing mode) and the mechanical shutter control image (still image capturing mode) according to the first embodiment of the present invention.
Figure 3B:
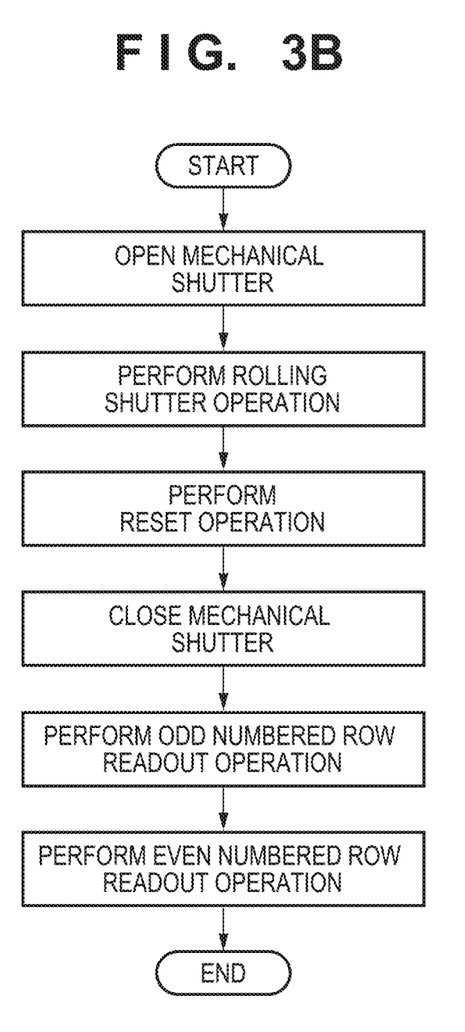

In this embodiment, as shown in FIG. 2B, an operation of reading out the charges from the pixels is separately performed so that the charges are read out first from the pixels on the subsequent even numbered rows, and then the charges are read out from the pixels on the subsequent odd numbered rows. The signals read out from the pixels are processed by a signal processing unit 206, and corrected. Correction by the signal processing unit 206 will be explained. Processing from the time t3 at which the mechanical shutter performs the light-shielding operation until the time t4 at which the readout operation starts is common to the respective pixels, and is thus not considered. On the first row of the even numbered rows, a signal a0 corresponding to the exposure time and noise b dependent on the accumulation time corresponding to the time taken to read out the signals, that is, (a0+b) is obtained. Furthermore, on the next row of the even numbered rows, the sum (a2+2b) of a signal a2 corresponding to the exposure time and noise 2b dependent on the accumulation time corresponding to the time taken to read out the signals is obtained. In this way, since the noise dependent on the accumulation time is considered to be proportional to the time after the time t4, the signals obtained on the even numbered rows during the period from the time t4 to a time t4a are as indicated by the shot image of the even numbered rows in FIG. 4B, and can be represented by expression (1) below.

Output signals on respective even numbered rows (0th, 2nd, 4th, . . . , 2nth rows):

$$a0+b, a2+2b, a4+3b, \ldots, a2n+nb \tag{1}$$

Figure 4B:
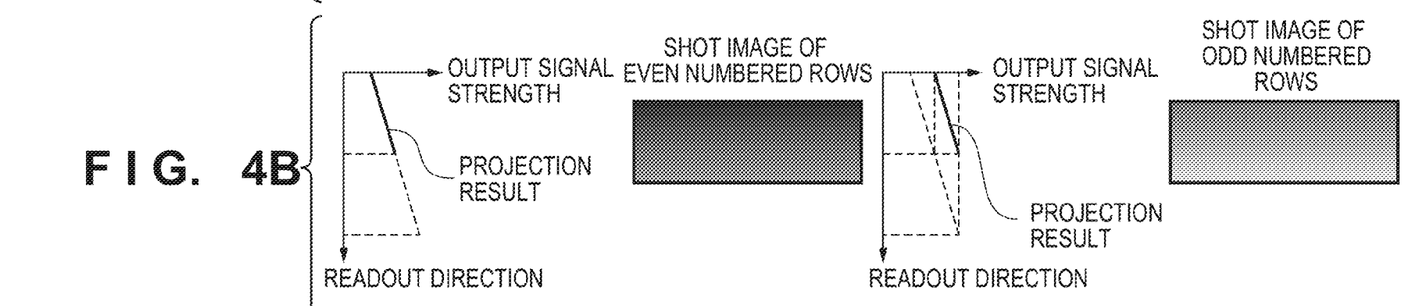

Similarly, the signals obtained on the odd numbered rows during the period from the time t4a to a time t5 are as indicated by the shot image of the odd numbered rows in FIG. 4B, and are represented by expression (2) below.

Output signals on respective odd numbered rows (1st, 3rd, . . . , (2n+1)th rows):

$$a1+(n+1)b, a3+(n+2)b, \ldots, a(2n+1)+2nb \tag{2}$$

The total sum of the differences between the signals on the even numbered rows and odd numbered rows is given by odd numbered rows−even numbered rows:

$$(a1+a0+nb)+(a3-a2+nb)+ \ldots +(a(2n+1)-a2n+nb) \tag{3}$$

Figure 4C:
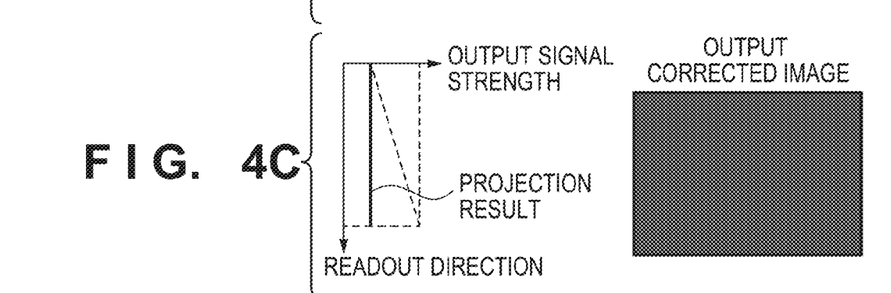

Since the signals by the incident light from the object can be considered to be almost equal to each other on the upper and lower adjacent rows in the image of the even numbered rows and the image of the odd numbered rows, the difference between the signals on the adjacent rows can be assumed to be 0. That is, since each part of a1−a0, . . . , a(2n+1)−a2n in the above expression (3) can be assumed to be 0, each bracketed part of expression (3) representing the difference between the signal of the pixel on the odd numbered row and that of the pixel on the even numbered row can be assumed to be nb. Since the signals are separately read out on the even numbered rows and the odd numbered rows, the difference in accumulation time between the 0th and first rows is (t4a−t4), as shown in FIG. 2B. The signal processing unit 206 generates correction data for correcting noise based on the time difference (t4a−t4) and the difference nb between the signal of the pixel on the odd numbered row and that of the pixel on the even numbered row, and corrects noise dependent on the accumulation time, thereby obtaining an output corrected image shown in FIG. 4C. In this case, a portion where the difference is obtained may be part of the image sensor. As the difference in accumulation time is larger, the difference in noise dependent on the accumulation time is larger. Thus, it is advantageous in detection.

In the above example, a case in which the adjacent upper and lower pixels are not largely different in signal charges by the incident light from the object has been explained. When, however, a high-contrast object image is captured, there is a portion where it is impossible to approximate the difference between the signals of adjacent upper and lower pixels to 0. In this case, it is possible to obtain a correction value for appropriately correcting noise in accordance with the accumulation time difference by, for example, performing processing of obtaining the difference between the signals of the pixels on the odd numbered row and even number numbered row in a plurality of portions, and averaging the obtained differences or obtaining the median of the differences. Since it is possible to average variations of signals as a whole by increasing the number of portions where the difference is obtained, a local difference in signal can be canceled. Therefore, the differences may be obtained from all the even numbered rows and odd numbered rows. A region where the difference is obtained may be selected from a portion where a change in screen is small. Correction may be performed according to the readout time difference using, as the magnitude of noise dependent on the accumulation time, a value at the time of the last image capturing operation or a value obtained according to shooting conditions. The above-described processing of obtaining a correction value may be performed on an apparatus different from the camera with which shooting has been performed.

(Second Embodiment)

The second embodiment of the present invention will be described below.

When n represents the number of rows of pixels arranged in a matrix and t represents the time taken to read out the charge accumulation amounts of all the pixels, the time taken to read out the amounts on the nth row simply increases by t, as compared with the first row. During this time, in addition to charges obtained by converting incident light from an object, noise charges such as a dark current generated by a pixel unit and the like are accumulated in photodiodes. Therefore, there is a difference in noise charges dependent on the readout time between the nth and first rows, in addition to the signal charges.

The accumulation time differences after a light-shielding operation are shown below from the first row.

accumulation time difference on the first row . . . $t/n$
accumulation time difference on the second row . . . $2t/n$
accumulation time difference on the third row . . . $3t/n$
accumulation time difference on the nth row . . . $nt/n$ As for the signals of pixels with the same color on rows whose accumulation times are different from each other are represented as follows. For example, a signal on the first row is represented by the sum $(s1+t/n*a)$ of a signal s1 obtained by converting incident light from an object and noise $t/n*a$ dependent on an accumulation time and corresponding to the accumulation time. Similarly, a signal on the second row is represented by the sum $(s2+2t/n*a)$ of a signal s2 and noise $2t/n*a$ dependent on an accumulation time and corresponding to the accumulation time. The pixels with the same color on the first and second rows whose accumulation times are different from each other undergo a subtraction operation, thereby obtaining $(s2-s1)+t/n*a$. A signal obtained based on the difference between the pixels with the same color and noise dependent on an accumulation time are represented by expressions below.

A signal obtained based on the difference between the signals of the pixels with the same color on adjacent rows:

$$s2-s1, s3-s2, \ldots, sn-s(n-1) \quad (4)$$

Noise dependent on an accumulation time obtained based on the difference between the pixels with the same color:

$$t/n*a, t/n*a, \ldots, (n-(n-1))*t/n*a \quad (5)$$

The above difference between the signals of the pixels with the same color on the adjacent rows, for example, a signal obtained by s2−s1 is approximately 0. A subtraction operation is performed for a plurality of sets of pixels with the same color and different accumulation times, thereby obtaining differences. By averaging the obtained differences, noise dependent on an accumulation time for each set of signals between which the difference has been obtained is extracted. It is possible to appropriately correct the noise due to the accumulation time difference between the upper and lower pixels by obtaining correction data from the noise dependent on the accumulation time, and correcting noise dependent on the accumulation time difference t/n between the respective rows. Note that a case in which adjacent upper and lower pixels are not largely different in signal charges by the incident light from the object has been described in the above expressions. When, however, a high-contrast object image is captured, it is possible to appropriately correct noise by performing processing of obtaining noises b dependent on an accumulation time from difference images obtained in a plurality of portions, and averaging the noises or obtaining the median of the noises. In this case as well, the above-described correction processing may be performed on an apparatus different from a camera with which shooting has been performed.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-238266, filed, Nov. 18, 2013, which is hereby incorporated by reference herein in its entirety.

What is claimed is:

1. An image capturing apparatus comprising:
a plurality of pixels arranged to form a plurality of rows;
a readout circuit configured to read out signals from pixels of a selected row of the plurality of rows; and
a signal processing unit configured to process signals read out by the readout circuit,
wherein the apparatus has (a) a first mode in which a charge accumulation is controlled by an electronic shutter, and (b) a second mode in which the charge accumulation is controlled by a mechanical shutter, and
wherein in the second mode, the signal processing unit corrects the signals read out from the pixels of the selected row of the plurality of rows based on differences between signals read out by the readout circuit from pixels of a first row of the plurality of rows and signals read out by the readout circuit from pixels of a second row of the plurality of rows.

2. The apparatus according to claim 1, wherein the signal processing unit corrects the signals read out from the pixels of the selected row of the plurality of rows based on a time from when the mechanical shutter shields the plurality of pixels from light until the signals of the pixels of the selected row are read out by the readout circuit.

3. The apparatus according to claim 1, wherein the first row is one of odd numbered rows of the plurality of rows, and the second row is one of even numbered rows of the plurality of rows.

4. The apparatus according to claim 3, wherein the first row and the second row are arranged adjacent to each other.

5. The apparatus according to claim 3, wherein the plurality of pixels are pixels corresponding to a same color.

6. The apparatus according to claim 1, wherein the signals are read out in an arrangement order of the rows.

7. The apparatus according to claim 1, wherein a readout period during which the readout circuit reads out signals from the plurality of pixels includes a period during which pixels of odd numbered rows of the plurality of rows are continuously read out, and a period during which pixels of even numbered rows of the plurality of rows are continuously read out.

8. The apparatus according to claim 1, wherein the correction by the processing unit is performed when the first mode is switched to the second mode.

9. The apparatus according to claim 1, wherein the differences are caused by a difference between a period during which charges of the pixels of the first row is held and a period during which charges of the pixels of the second row is held.

* * * * *